Oct. 29, 1957 E. A. TERRY 2,810,989
HORTICULTURAL CONTAINERS
Filed July 8, 1953
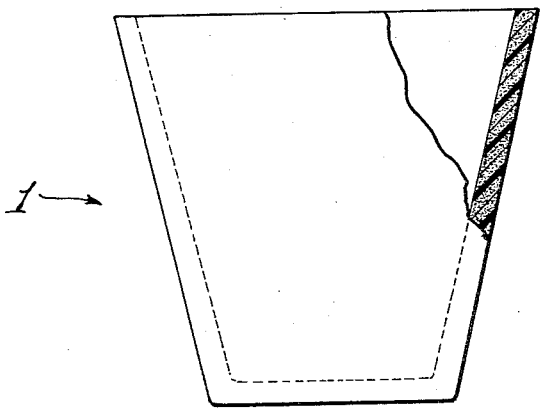
INVENTOR.
Everett A. Terry.
BY

2,810,989

HORTICULTURAL CONTAINERS

Everett A. Terry, Somers, Conn.

Application July 8, 1953, Serial No. 366,870

2 Claims. (Cl. 47—34)

This invention relates to horticultural containers and to processes for preparing them. More particularly the invention relates to flower pots comprising sand particles bonded with a synthetic resin.

Conventional flower pots are made of clay shaped on a potter's wheel and fired in high temperature kilns. The pots are easily made and are in almost universal use. However, the clay pots are brittle and although not entirely impervious to water and air are sufficiently impervious to make it necessary to have a hole in the bottom thereof to drain off excess water. Moreover the clay pots are of a dull red color which cannot be easily modified.

One object of this invention is to provide new horticultural containers.

A further object is to provide flower pots pervious to air and water.

Another object is to provide flower pots which are relatively light in weight and relatively non-brittle.

These and other objects are attained by preparing horticultural containers from sand and a synthetic resin by a process which comprises contacting a heated mold with a mixture of sand and resin for a short time, removing excess mixture, and setting the resin.

The accompanying drawing illustrates a flower pot constructed in accordance with the invention, the figure being a side elevational view, partly in section, of a flower pot.

Referring to the drawing, the flower pot is generally indicated by the numeral 1 made of the materials of the invention, sand and resin as shown, in the manner below described.

The following examples are given in illustration and are not intended as limitations on the scope of this invention. Where parts are mentioned they are parts by weight.

Example I

Prepare a metal pattern of a flower pot in any desired shape. Heat the pattern to 500–600° F. and fill the heated pattern with a foundry sand of 75 fineness on AFS fineness scale, the grains of said sand carrying a coating of a thermosettable phenolformaldehyde resin. The coating should amount to about 4% by weight of the sand. Allow the coated sand to stay in the pattern for about 5 seconds. Then invert the pattern and allow excess sand to flow away. A flower pot is obtained having a wall thickness of about ⅜". Heat the pot at 300° F. for about 5 minutes. The pot is then in its final form and needs no further finishing.

If no color is used, the pot is of a pleasing light brown color with a smooth outer surface and a slightly rough inner surface. The pot if placed in water will absorb the water, apparently by capillary action. On the other hand if soil is placed in the pot and too much water is added to the soil, the water will gradually pass through the walls of the pot thus preventing root rot of plants growing in the soil.

A pot made by the process of Example I is about 50% lighter than a standard clay pot of the same dimensions. The pot may be dropped from a height of about 5 feet without substantial breakage thereof.

Example II

Prepare a metal pattern of a flower pot and attach it to a match plate. Heat the pattern to 500–600° F. and clamp it to a mold box filled with sand coated with 4% by weight of a thermosettable phenol-formaldehyde resin. Invert the mold box so that the coated sand falls onto the hot pattern. After 2 seconds, turn the box right side up so that excess sand falls away from the pattern. A thin shell of bonded sand is left on the pattern. Place the pattern with the shell still on it into an oven at 300–400° C. and heat the shell and pattern for about 15 minutes to set the resin. Cool the shell and pattern and remove the shell. The product is a flower pot having a wall thickness of about ⅜".

This pot is substantially the same as that made by Example I in all physical characteristics except that the smooth surface is on the inside. If the sand used is a bright sand, the outer surface of the pot will have a pleasing sparkle.

If it is desired to have a colored flower pot, it is a simple matter to incorporate an organic or inorganic pigment in the coated sand to obtain bright colored plain or mottled pots.

If Example I is repeated except that a dry mixture of sand, pulverulent phenol-formaldehyde and pulverulent cadmium red is used, the flower pot produced is highly colored and has a much smoother surface on the outside of the pot due to migration of the resin in the forming operation.

The process of this invention is adapted to a continuous chain operation using a plurality of patterns in mold boxes set on a travelling belt. The patterns are heated in an oven and automatically positioned in each box as the boxes pass the oven. Immediately thereafter a mixture of sand and resin is blown into the box and over the pattern until the pattern is covered with an excess of the mixture. After a dwell against the heated pattern of from 1 to 5 seconds the box is overturned releasing excess sand. The box is then removed, the formed pot while still on the pattern is passed through an oven to set the resin. Such a continuous chain operation may easily be arranged so that no manual handling of boxes, patterns or pots is necessary from start to finish.

The sands which should be used are dry silica sands containing less than 3% clay. The fineness of the sand depends on the properties desired in the product. If a flower pot is desired having high degree of capillarity in order to provide free transfer of moisture and air, the sand should be of medium fineness, i. e. about 75 on the AFS scale. For soil-less culture applications, a coarse sand should be used. The resultant pots would make it possible to grow plants in sand in the pot with the culture medium being supplied through the walls thereof by immersion of the pot in the hydroponics solution in a tray or trough.

For other types of culture, it may be desirable to reduce the capillarity of the pots either by using a fine sand or by mixing a medium sand with such fine materials as silica flour or zirconite flour. The pots may be made so impervious to moisture and air by this method that it is necessary to have a hole in the bottom of the pot similar to that in the clay pots now used.

The synthetic resin used to make the flower pots may be a thermosetting or thermoplastic resin. Most convenient for the process are resins such as phenol, urea or melamine formaldehyde resins. These resins should be used in their fusible state. They may be advanced to the insoluble state or may be used in the soluble condition. If used in the insoluble state, the resins should be in pulverulent form and should be mixed dry with the sand until a uniform mixture is obtained. Dry colors may be added during the mixing operation. The dry mixtures are particularly advantageous for processes requiring blowing of the sand into the mold box.

If the resins used are still soluble, they may be dissolved in water or an organic solvent and the solution used to coat the sand grains. The solvent is removed by air or forced drying before the molding operation is started.

If thermoplastic resins such as polystyrene, polyethylene, polyvinyl chloride or other vinyl polymers and copolymers are used they generally should be employed in a pulverulent form. The final set of the formed flower pots is obtained in this case by cooling the formed pots below the softening point of the resin. A stream of cold air is usually sufficient to bring about a rapid set. The physical properties of the flower pots made with thermoplastic resins may be varied widely. Polystyrene for example, will give pots of lighter and more brilliant color and which are quite rigid. Polyethylene on the other hand, will give pots which are somewhat duller in color and may become somewhat flexible. Synthetic rubbers such as butadiene-styrene copolymers may be deposited directly on the sand particles from the latices in which they are produced. Flower pots made from the synthetic rubbers will be slightly flexible and the rubber may be vulcanized in the setting operation if desired.

The amount of resin used may vary from 0.5 to 15% by weight of the sand. For the dry sand resin mixtures, amounts ranging from 4 to 15% are sufficient to yield strong pots. For the coated sand process, it is preferred to use from 2 to 6% resin. If a liquid resin is used, amounts as low as 0.5% will yield a well-bonded article. The larger amounts of resin are used when it is desired to decrease the capillarity of the pot. Above 15% resin, the products have little advantage over flower pots made from 100% resin molding compositions.

The initial forming step of this process is carried out at from 300–1000° F. by heating only the pattern to that temperature. The process is equally efficient whether the sand resin mixture is poured into the pattern or onto it. The surface of the formed pot next to the pattern will take on the nature of the pattern surface. A smooth pattern yields a smooth surface pot. If desired the pattern may be carved in intricate designs to add further attractiveness to the products. The surface of the pot not contiguous to a pattern surface will be rough and grainy according to the size of the sand used and the amount of resin used. The thickness of the pot will depend on the length of dwell of the sand-resin mixture against the hot pattern. From 1 to 20 seconds dwell will yield wall thicknesses of from 1/8 to 1/2".

After the initial forming operation excess sand-resin mixture is removed by simply pouring it off. Then the formed pot and the pattern are treated to set the resin therein. If the resin is thermosetting, setting is accomplished by heating it for from 1 to 15 minutes at 250–400° C., no pressure being needed. If the resin is thermoplastic, rapid cooling to a temperature below the softening point of the resin is required. This may be accomplished by a stream of cold air or cold water or by merely dumping the pot into cold water.

After the setting operation is complete, the pot is finished and may be removed from the pattern and no further finishing operations are necessary. A completed attractive flower pot is obtained which is about 50% lighter than clay pots of the same dimensions. Furthermore the relatively high capillarity of the walls permits relatively free transfer of air and moisture to attain optimum conditions for sturdy root growth. The high capillarity has an additional advantage that plants grown therein may be watered by merely setting the pots in a pan of water, the water being drawn through the plants by capillary action.

Another advantage of the containers of this invention is that they can be readily prepared in a wide variety of shapes and sizes by the used of inexpensive patterns. Thus for greenhouse use, where large numbers of pots are used, many more pots could occupy the same space by making them square rather than round.

What is claimed is:

1. A flower pot adapted to contain soil and a growing plant, said pot comprising a compacted and shaped mass of sand bonded with a thermosetting resin wherein the thermosetting resin is a phenolformaldehyde resin.

2. A compacted air-pervious and water-pervious flower pot comprising 85% to 98% by weight of sand particles, and 2% to 15% by weight of a thermosetting resin in the thermoset condition in contact with the sand particles, at least some of the sand particles being bonded together by the resin adhering to the surface thereof and the sand particles being fixed in a condition of substantially uniform distribution throughout the mass by the thermoset resin.

References Cited in the file of this patent

UNITED STATES PATENTS

| | | |
|---|---|---|
| 126,311 | Loew | Apr. 30, 1872 |
| 1,212,428 | Watson | Jan. 16, 1917 |
| 1,869,606 | Mennell et al. | Aug. 2, 1932 |
| 2,028,808 | Rosenthal | Jan. 28, 1936 |
| 2,094,513 | Wilson et al. | Sept. 28, 1938 |
| 2,133,027 | Honig | Oct. 11, 1938 |
| 2,189,889 | Engel | Feb. 13, 1940 |
| 2,203,421 | Stevenson et al. | June 4, 1940 |
| 2,527,387 | Arndt | Oct. 24, 1950 |
| 2,654,925 | Ensign | Oct. 13, 1953 |

FOREIGN PATENTS

| | | |
|---|---|---|
| 585,395 | Great Britain | Feb. 6, 1947 |